(12) United States Patent
Dolgin et al.

(10) Patent No.: US 12,307,635 B2
(45) Date of Patent: May 20, 2025

(54) IMAGE SIGNAL PROCESSOR

(71) Applicant: QUALCOMM Incorporated, San Diego, CA (US)

(72) Inventors: Yuri Dolgin, Haifa (IL); Maksym Aslianskyi, Tel Aviv (IL); Costia Parfenyev, Haifa (IL); Eran Pinhasov, Zichron Yaakov (IL); Victor Pinto, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 17/746,769

(22) Filed: May 17, 2022

(65) Prior Publication Data

US 2023/0377096 A1    Nov. 23, 2023

(51) Int. Cl.
*G06T 5/60* (2024.01)
*G06T 3/40* (2006.01)
*G06T 5/50* (2006.01)
*G06T 5/70* (2024.01)
*H04N 23/81* (2023.01)

(52) U.S. Cl.
CPC ............... *G06T 5/70* (2024.01); *G06T 3/40* (2013.01); *G06T 2207/10016* (2013.01); *G06T 2207/20081* (2013.01); *G06T 2207/20182* (2013.01)

(58) Field of Classification Search
CPC . G06T 2207/10016; G06T 2207/20081; G06T 2207/20182; G06T 5/60; G06T 2207/10024; G06T 2207/20016; G06T 2207/20084; G06T 5/50; H04N 23/81
See application file for complete search history.

(56) References Cited

U.S. PATENT DOCUMENTS

2018/0114294 A1 * 4/2018 Yang .................... G06T 7/90

OTHER PUBLICATIONS

Lee, Denoising Algorithm for CFA Image Sensors Considering Inter-Channel Correlation, Sensors 2017, 17, 1236 (Year: 2017).*
Hasselgren, Neural Temporal Adaptive Sampling and Denoising, EUROGRAPHICS 2020, DOI: 10.1111/cgf. 13919, vol. 39 ( 2020), No. 2 (Year: 2020).*
Chen, Deep RNNs for Video Denoising, Proc. of SPIE vol. 9971 99711T-1, doi: 10.1117/12.2239260, 2016 (Year: 2016).*

(Continued)

*Primary Examiner* — Vu Le
*Assistant Examiner* — Lei Zhao
(74) *Attorney, Agent, or Firm* — Polsinelli LLP

(57) ABSTRACT

The present disclosure generally relates to image processing. For example, aspects of the present disclosure include systems and techniques for performing spatial and temporal processing of image data. Certain aspects provide an apparatus for processing frame data. The apparatus generally includes a memory, and one or more processors coupled to the memory, the one or more processors configured to: perform a first noise reduction operation based on first frame data via a machine learning component to generate first processed frame data; generate first feedback data based on the first processed frame data; and perform, via the machine learning component, a second noise reduction operation based on second frame data and the first feedback data.

25 Claims, 13 Drawing Sheets

(56) References Cited

OTHER PUBLICATIONS

Chen X., et al., "Deep RNNs for Video Denoising", [Proceedings of SPIE ISSN 0277-786X vol. 10524], SPIE, US, vol. 9971, Sep. 28, 2016, pp. 99711T-1-99711T-10, XP060078021, DOI: 10.1117/12.2239260, ISBN: 978-1-5106-1533-5, Title Section "4.2 Implementation", Figures 1a, 4a.

Hasselgren J., et al., "Neural Temporal Adaptive Sampling and Denoising", Computer Graphics Forum : Journal of the European Association for Computer Graphics, Wiley-Blackwell, Oxford, vol. 39, No. 2, Jul. 13, 2020, pp. 147-155, XP071545869, ISSN: 0167-7055, DOI: 10.1111/CGF.13919, Figure 2, p. 150, Left-hand Column, Last Paragraph Equation 1.

International Search Report and Written Opinion—PCT/US2023/066777—ISA/EPO—Jul. 24, 2023.

Lee M.S., et al., "Denoising Algorithm for CFA Image Sensors Considering Inter-Channel Correlation", Sensors, vol. 17, No. 6, May 28, 2017, pp. 1-22, XP55590892, DOI: 10.3390/s17061236, Figure 3.

Liu Z., et al., "Image Denoising Based on A Cnn Model", 2018 4th International Conference on Control, Automation and Robotics (ICCAR), IEEE, Apr. 20, 2018, pp. 389-393, XP033358899, DOI: 10.1109/ICCAR.2018.8384706 [retrieved on Jun. 13, 2018], p. 390, Left-hand column, Last paragraph—Right-hand column, Line 12.

Ma B., et al., "A Multi-Scale Video Denoising Algorithm for Raw Image", Methods, Algorithms and Applications, Sep. 5, 2022, 14 Pages, XP93063830, [retrieved on Jul. 13, 2023], Figure 1, Section "4.3 Denoising Module".

Sun L., et al., "Deep Maximum a Posterior Estimator for Video Denoising", arxiv.org, Cornell University Library, 201 Olin Library Cornell University Ithaca, NY 14853, vol. 129, No. 10, Aug. 4, 2021, pp. 2827-2845, XP037590697, DOI: 10.1007/S11263-021-01510-7 [retrieved on Aug. 4, 2021], Figure 3c.

Yan Z., et al., "On Combining CNN With Non-Local Self-Similarity Based Image Denoising Methods", IEEE Access, IEEE, USA, vol. 8, Dec. 30, 2019, pp. 14789-14797, XP011768334, DOI: 10.1109/ACCESS.2019.2962809, [retrieved on Jan. 23, 2020], Figure 2.

\* cited by examiner

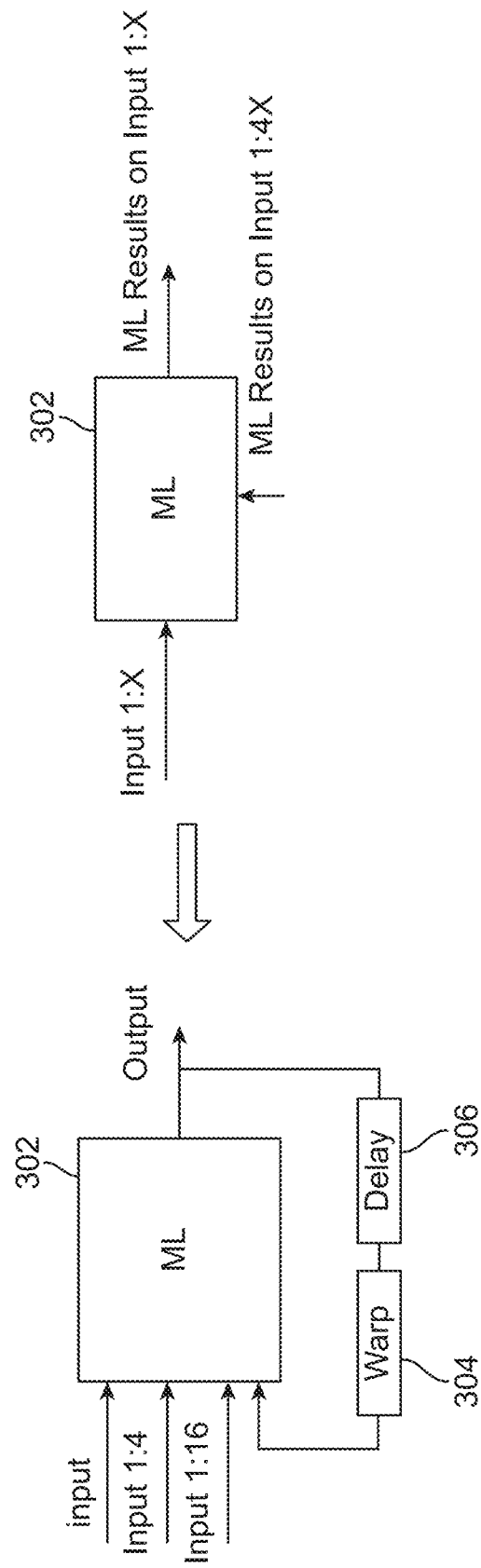

IMAGE SIGNAL PROCESSOR

FIELD

The present disclosure generally relates to image processing. For example, aspects of the present disclosure include systems and techniques for performing spatial and temporal processing of image data.

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

Traditional image signal processors (ISPs) have separate discrete blocks that address the various partitions of the image-based problem space. For example, a typical ISP has discrete functional blocks that each apply a specific operation to raw camera sensor data to create a final output image. Such functional blocks can include blocks for demosaicing, noise reduction (denoising), color processing, tone mapping, among many other image processing functions. Each of these functional blocks contains many pre-tuned parameters, resulting in an ISP with a large number of pre-tuned parameters (e.g., over 10,000) that must be re-tuned according to the tuning preference of each customer. Such hand-tuning of parameters is very time-consuming and expensive, and thus is generally performed once. Once tuned, a traditional ISP generally uses a limited set of tuning settings for processing images. For example, there may be one set of tuning settings for processing low light images, and a second set of tuning settings for processing bright light images. For any individual image, a static tuning setting is used for processing the full image.

SUMMARY

Certain aspects provide an apparatus for processing frame data. The apparatus generally includes a memory, and one or more processors coupled to the memory, the one or more processors configured to: perform a first noise reduction operation based on first frame data via a machine learning component to generate first processed frame data; generate first feedback data based on the first processed frame data; and perform, via the machine learning component, a second noise reduction operation based on second frame data and the first feedback data.

Certain aspects provide a method for processing frame data. The method generally includes performing a first noise reduction operation based on first frame data via a machine learning component to generate first processed frame data; generating first feedback data based on the first processed frame data; and performing, via the machine learning component, a second noise reduction operation based on second frame data and the first feedback data.

Certain aspects provide a non-transitory computer-readable medium having instructions stored thereon, that when executed by a processor, causes the processor to: perform a first noise reduction operation based on first frame data via a machine learning component to generate first processed frame data; generate first feedback data based on the first processed frame data; and perform, via the machine learning component, a second noise reduction operation based on second frame data and the first feedback data.

BRIEF DESCRIPTION OF THE DRAWINGS

Illustrative embodiments of the present application are described in detail below with reference to the following drawing figures:

FIGS. 5A, 5B, and 5C are diagrams illustrating examples of ML components performing video processing using different resolution versions of an input frame, in accordance with certain aspects of the present disclosure.

DETAILED DESCRIPTION

Figure 1:
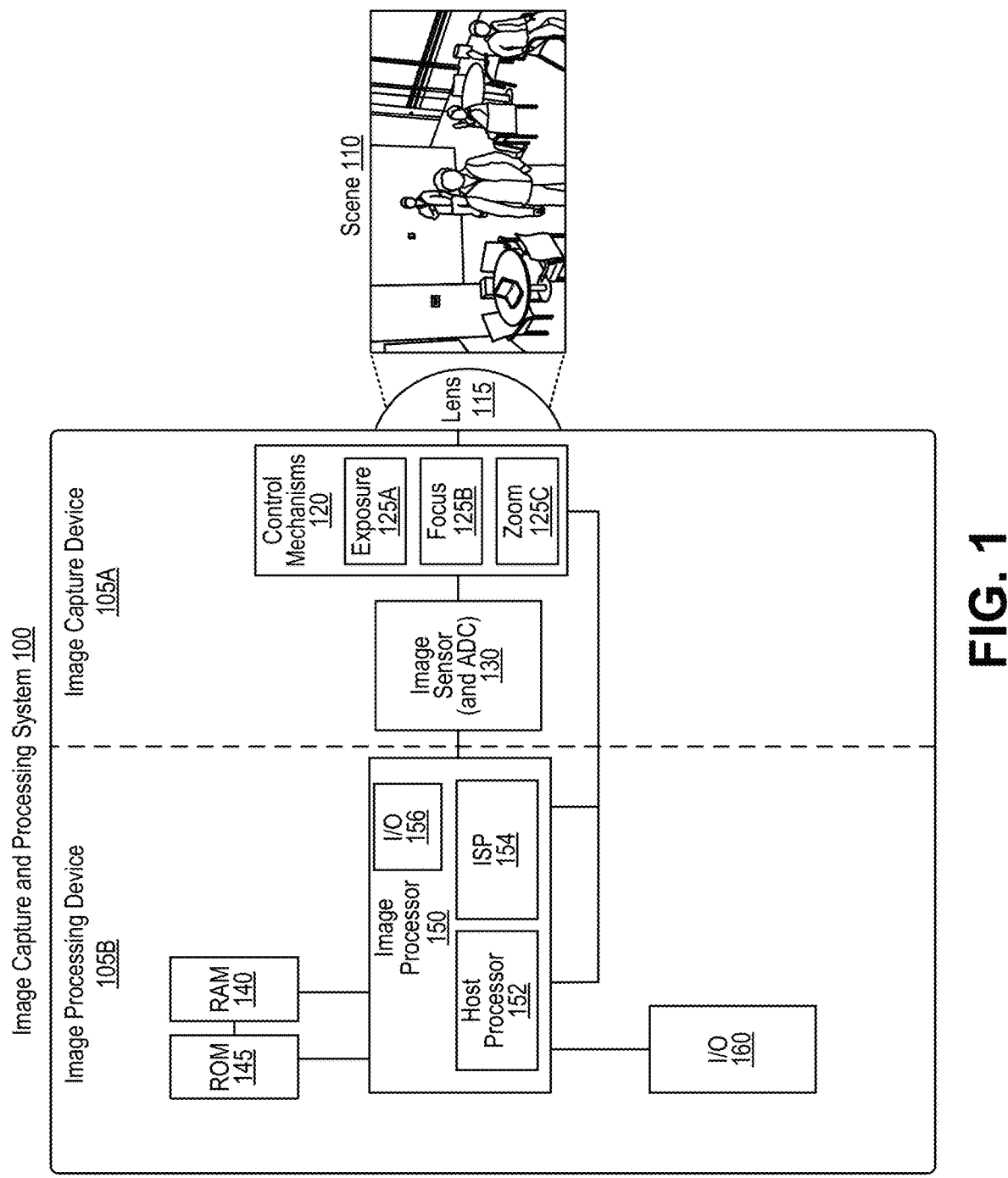
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Image capture devices capture images by receiving light from a scene using an image sensor with an array of photodiodes. An image signal processor (ISP) then processes the image data captured by the photodiodes of the image sensor into an image that can be stored and viewed by a user. How the scene is depicted in the image depends in part on capture settings that control how much light is received by the image sensor, such as exposure time settings and aperture size settings. How the scene is depicted in the image also depends on how the ISP is tuned to process the photodiode data captured by the image sensor into an image.

An ISP can be designed to use one or more trained machine learning (ML) models (e.g., trained neural networks (NNs) and/or other trained ML models). For example, a fully ML-based ISP can pass image data into one or more neural networks (or other trained ML models), which can output an image that can be stored and viewed by a user. An ML-based ISP can be more customizable than a pre-tuned ISP. For example, an ML-based ISP can process different images in different ways, for instance based on the different scenes depicted in the different images. However, a fully ML-based ISP can also require a higher silicon area than a pre-tuned ISP due to a large number of components required to perform quick image processing. A fully ML-based ISP also requires heavy computational resources, as many pixels need to be processed. A fully ML-based ISP can therefore draw heavily from limited battery life and computational resources. Thus, use of a fully ML-based ISP by devices with limited battery life and computational resources, such as mobile devices, may result in reductions to the already-limited battery lives of these devices, slowdowns in computing abilities of these devices, and the like. Similarly, a fully ML-based ISP may occupy a significant amount of space in devices with limited space for internal electronics, such as mobile devices. In some cases, a fully ML-based ISP can be inefficient for certain ISP tasks—for instance, a convolutional neural network (CNN) can be less efficient at performing tonal adjustment than pre-tuned ISP components.

Systems, apparatuses, processes (also referred to as methods), and computer-readable media (collectively referred to herein as "systems and techniques") are described herein for providing temporal and spatial video processing. For example, an ML component of a system may be implemented with a feedback path, allowing a processed version of a first frame of a video to be used for processing of a second subsequent frame of the video. The processed frame may be warped to align features of the processed frame with features of the second subsequent frame, allowing the ML component to perform image processing (e.g., denoising or other processing) on the second frame based on the processed frame received via the feedback path. In some aspects, the spatial and temporal processing via the ML component may be implemented along with another suitable image filter. For example, the output of the ML component may be provided to the image filter for further processing, as described in more detail herein.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1310 discussed with respect to the computing system 1300. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/5020, read-only memory (ROM) 145/5025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1335, any other input devices 1345, or some combination thereof. In some cases, a caption may be input into the image processing device 105B through a physical keyboard or keypad of the I/O devices 160, or through a virtual keyboard or keypad of a touchscreen of the I/O devices 160. The I/O device 160 may include one or more ports, jacks, or other connectors that enable a wired connection between the system 100 and one or more peripheral devices, over which the system 100 may receive data from the one or more peripheral device and/or transmit data to the one or more peripheral devices. The I/O device 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O device 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
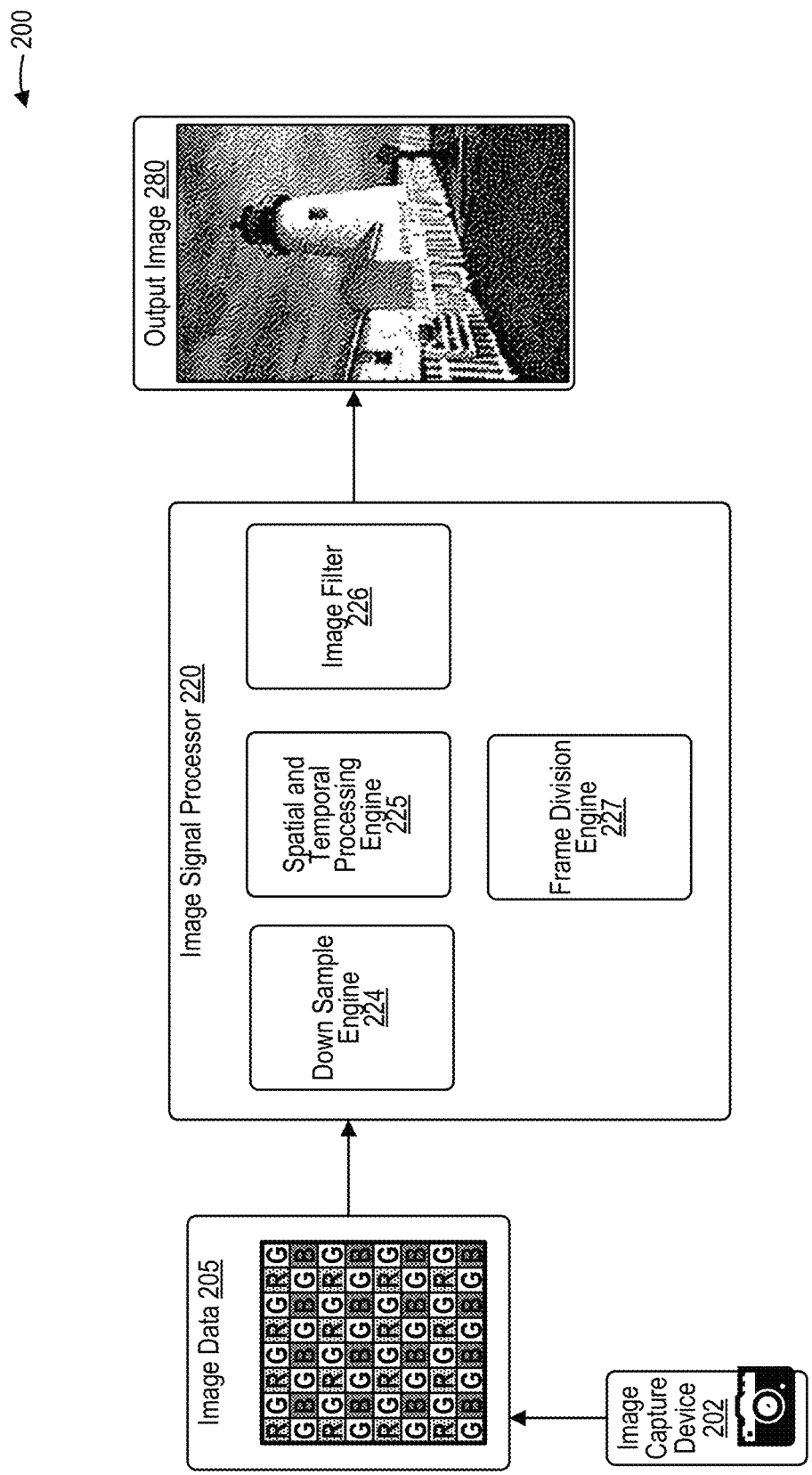
FIG. 2 is a block diagram illustrating an example architecture of an imaging system with an image signal processor (ISP), in accordance with some examples.

FIG. 2 is a block diagram illustrating an example architecture of an imaging system 200 with an image signal processor (ISP) 220 that may implement ML-based spatial and temporal video processing, in accordance with some examples. The imaging system 200 includes an image capture device 202 that captures image data 205. The image capture device 202 can be an example of an image capture device 105A. The image capture device 202 can include, for example, an image sensor 130 and/or one or more control mechanisms 120. A representation of the image data 205 is depicted, including pixels with a single color component (e.g., red, green, or blue) each, with each color component corresponding to a color component of a color filter array (CFA) of the image capture device 202.

The imaging system 200 may include an ISP 220 for video image processing. Various image and video processing techniques may be used to reduce noise and improve the quality of images and videos. In some implementations, deep learning techniques may be used to select meta-data about the video (e.g., the best exposure, tone, or colors) and apply the meta-data to improve the video output. Deep learning may also be used to perform pixel processing in an attempt to increase video quality. Deep learning may be used to understand the context associated with the video and extract semantic information as inputs for improving the video using image signal processing.

Certain aspects of the present disclosure implement machine learning for improving video quality (e.g., reducing noise) based on temporal and spatial information. The ML system provided herein is trained and learns complex statistical relations associated with spatial and temporal information of frames. The spatial and temporal information may be jointly processed by the ML system.

The imaging system 200 may include an ISP 220 with a down-sample engine 224, a spatial and temporal processing engine 225, and an image filter 226. In some aspects, the spatial and temporal processing engine 225 may include a trained machine learning system and a feedback path to facilitate temporal and spatial processing (e.g., denoising). The trained machine learning system can include one or more trained convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. In some examples, the trained machine learning system includes one or more trained machine learning models. In some examples, the trained machine learning models include one or more trained neural networks (NNs). Examples of one or more trained NNs include the neural network 1200 of FIG. 12 described herein.

In some aspects, the ISP 220 may also include an image filter 226. Video processing may be performed using both the trained machine learning model and the image filter 226. The ISP may include a down-sample engine 224 which may generate a down-sampled version of the image data 205 to be processed via the spatial and temporal processing engine 225 and the image filter 226. In some cases, the processing of frames of the video may be performed using patches. For example, the ISP 220 may include a frame division engine 227 which may divide a frame (e.g., associated with image data 205) into regions or patches, to be processed sequentially. As shown, the ISP 220 generates an output image 280.

Figure 3A:
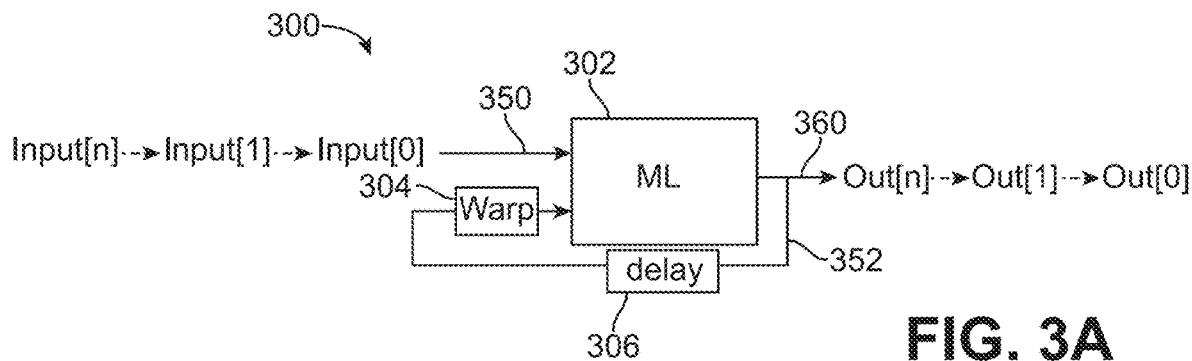
FIGS. 3A, 3B, 3C, and 3D are diagrams illustrating examples of video processing systems using spatial and temporal information, in accordance with certain aspects of the present disclosure.

FIGS. 3A to 3D illustrate a video processing system 300 using spatial and temporal information, in accordance with certain aspects of the present disclosure. As shown in FIG. 3A, video processing system 300 may include an ML component 302 which may receive an input frame (input[0]) at input 350 for processing. Input[0] may be one of a stream of frames of a video (e.g., including input[0], input[1], to input[n], n being any positive integer), which may be processed to generate output frames (e.g., out[0], out[1], to out[n]), respectively.

Video processing system 300 may also include a feedback loop 352 from an output of the ML component 302 to another input of the ML component 302. As shown, the feedback loop 352 may include a delay element 306 and a warp component 304. Initially, input[0] may be provided to the ML component 302 for processing. The ML component 302 generates an output frame (out[0]) at the output 360 which may be a processed version of input[0].

The warp component 304 may warp (e.g., shift or adjust) one or more pixels of the output frame (out[0]) at the output 360 to align one or more features of the output frame with a subsequent input frame (input[1]]) of the video. For example, an image capture device may capture the sequence of frames, one after another. From when one frame (e.g., input[0]) is captured until a subsequent frame (e.g., input[1]) is captured, the image capture device or objects in a scene being captured may move, resulting in misalignments of features in the captured frames. This movement may result in local motion corresponding to movement of one or more objects in the scene for which frames are being captured or global motion corresponding to movement of the entire scene.

To perform video processing using the sequence of frames, an alignment operation may be performed. For example, the warp component 304 may receive sensor data indicating a movement of the image capture device while the frames were captured. Based on the sensor data, the warp component 304 may determine a shift to be applied to one or more pixels of the frames in order to align the features (e.g., any feature such as an edge of a building) of the frames (e.g., of the processed input[0] being fed back and the input[1]). Moreover, the delay element 306 may synchronize the feedback of the output frame such that the output frame (as warped via warp component 304) is received at the input of the ML component 302 at about the same time as the subsequent input frame (e.g., input[1]). The ML component 302 then processes input[1] based on the feedback of the output frame (e.g., processed version of out[0]) to generate a subsequent output (out[1]). This process is repeated until all outputs (out[0] to out[n]) are generated.

Figure 3B:
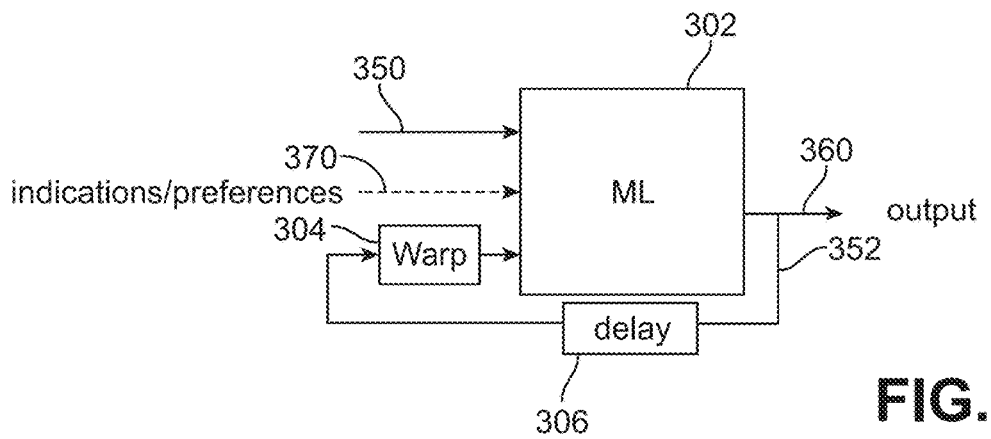

Some aspects allow for input to the ML system to steer the network capacity towards specific standards, such as improving the sharpening of a video at the cost of less denoising. As shown in FIG. 3B, the ML component 302 may also receive one or more indications or preferences associated with the processing by the ML component 302. For example, the ML component 302 may receive an indication 370 to increase the sharpness associated with a video at the cost of more noise. As another example, the indication or preference may indicate a trade-off between noise reduction and preservation of details in the image.

Figure 3C:
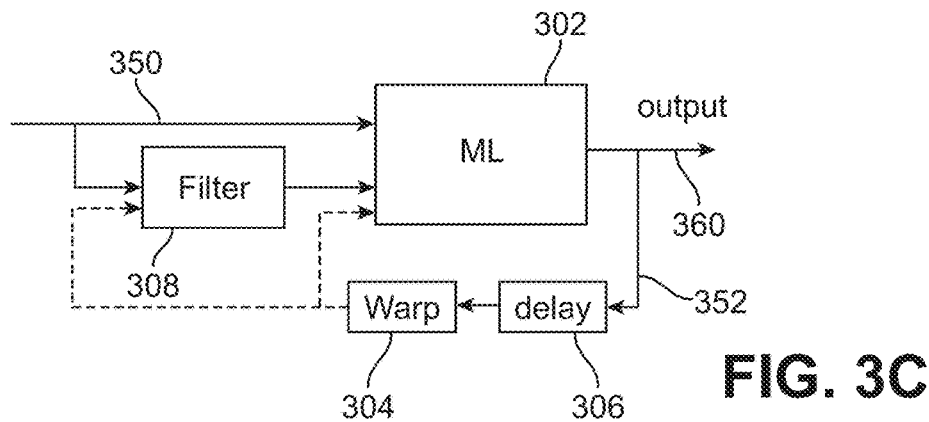
Figure 3D:
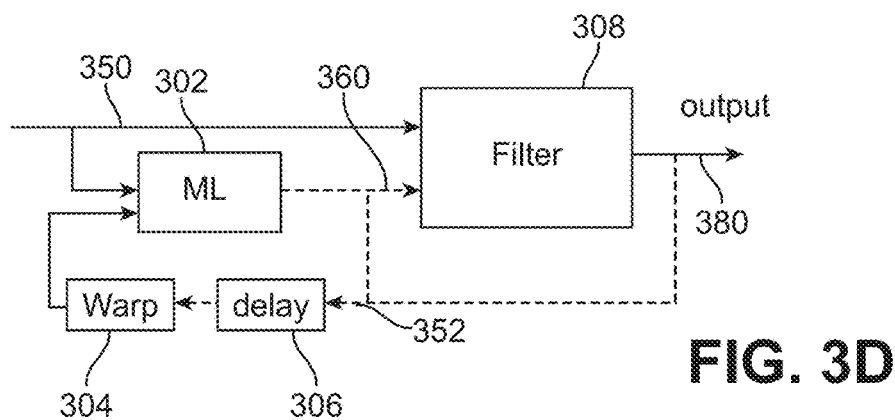

FIGS. 3C and 3D illustrate the video processing system 300 implemented using an ML component 302 and a filter component 308, in accordance with certain aspects of the present disclosure. For example, as shown in FIG. 3C, the input frame may be provided to both the ML component 302 and the filter component 308. The filter component 308 may filter the input frame using any suitable filtering technique. For example, the filter component 308 may perform a denoising operation of the input frame. The filtered input frame generated by the filter component 308 may be provided to the ML component 302. Moreover, video processing system 300 may also include a feedback loop from the output of the ML component 302 to an input of the ML component 302 through a warp component 304 and a delay element 306, as described herein.

The ML component 302 may process (e.g., performing a denoising operation) the input frame based on the filtered version of the input frame as output by the filter component 308, and feedback data received via the feedback loop 352 to implement spatial and temporal processing. In some implementations, the feedback loop 352 may be between the output of the ML component 302 and the input of the ML component 302.

In some implementations, the feedback loop 352 may be implemented from the output of the ML component 302 to an input of the filter component 308, as shown. In this case, the filter component 308 may perform the filter operation using the input frame and the feedback frame as warped via the warp component 304, providing a filtered frame output processed using temporal and spatial filtering. The ML component 302 then generates a processed output frame at output 360 based on the input frame and the filtered frame output generated by the filter component 308.

As shown in FIG. 3D, the input frame may be provided to the ML component 302 and the filter component 308. A feedback loop 352 having the delay element 306 and the warp component 304 may be implemented from the output of the filter component 308 to the input of the ML component 302, as shown. The ML component 302 performs temporal and spatial processing of the input frame and generates an output frame at output 360, which may be provided to another input of the filter component 308 as shown. The filter component 308 then generates an output frame at output 380 based on the input frame at input 350 and the output of the ML component 302.

Figure 4:
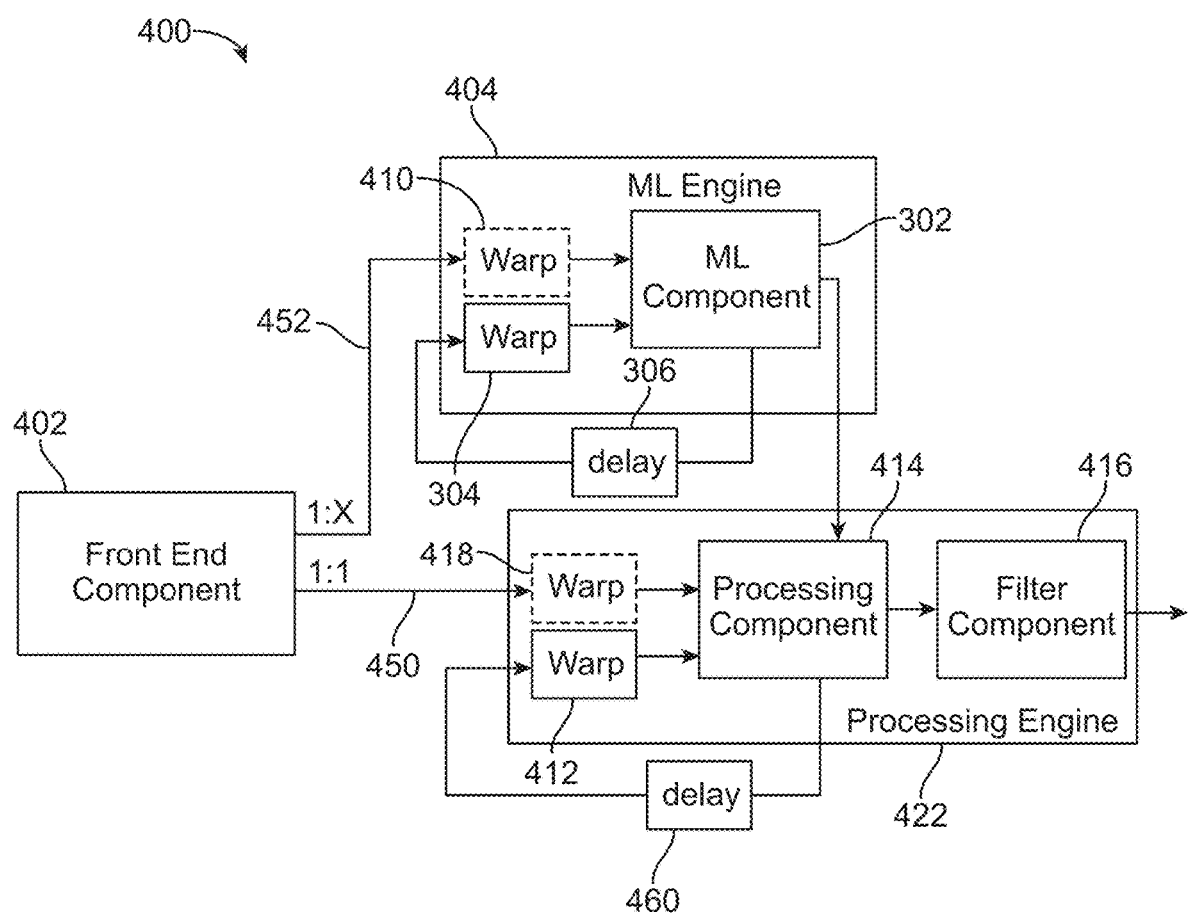
FIG. 4 is a diagram illustrating an example video processing system implemented by processing a down-sampled input frame, in accordance with certain aspects of the present disclosure.

FIG. 4 illustrates an example video processing system 400 implemented by processing a down-sampled input frame, in accordance with certain aspects of the present disclosure. The video processing system 400 may receive a series of frames (e.g., input[0], input[1], to input[n]) of a video and generate a series of output frames (out[0], out[1], to out[n]). As shown, video processing system 400 may include a front-end component 402 which may process the series of frames (e.g., input[0], input[1], to input[n]). The video processing system 400 may generate an input frame (e.g., input[1]) at input 450 and a down-sampled input frame at input 452. For example, the front-end component 402 may down-sample the input frame using a ratio 1 to X, X being any value greater than 1. As a specific example, the input frame may be down-sampled using a ratio of 1:2, and thus, the down-sampled input frame may have half the resolution of the input frame. The down-sampled input frame may be provided to the ML component 302 of an ML engine 404 for processing using the feedback loop, including delay element 306 and warp component 304, as described herein. The ML component 302 may perform, on the down-sampled input frame, denoising, sharpening, addition of bokeh, or any combination thereof. In some aspects, the down-sampled input frame may be further processed via warp component 410 before being provided to ML component 302.

The output of the ML component 302 may be provided to a processing component 414 of a processing engine 422, which also receives the input frame (e.g., input[1]) at input 450 (e.g., or a processed version thereof via warp component 418). In some aspects, the processing component 414 may be an ML component (e.g., implemented similarly as ML component 302) or any suitable filter component. The processing component 414 may perform denoising, sharpening, the addition of bokeh, or any combination thereof, on the input frame at input 450. A feedback loop with a delay element 460 and a warp component 412 may be implemented, allowing the processing component 414 to implement temporal and spatial processing as described herein. For example, the warp component 412 may warp (e.g., shift or adjust) one or more pixels of an output frame (e.g., out[0] generated based on input[0] before processing input[1]) generated by the processing component 414 to align one or more features of the output frame (e.g., out[0]) with the input frame (e.g., input[1]). The warped output frame is then provided to the processing component 414 to be used for processing the input frame (e.g., input[1]). The delay element 460 may synchronize the feedback of the output frame of the processing component 414 such that the output frame (as warped via warp component 304) is received at the input of the processing component 414 at about the same time as the input frame at input 450. In some cases, the input frame at input 450 may be further warped via a warping component 418 prior to being provided to the processing component 414. In some aspects, the output of the processing component 414 may be provided to a filter component 416, which may perform various filtering operations such as tone adjustments, color adjustments, or extra sharpening.

Figure 5C:
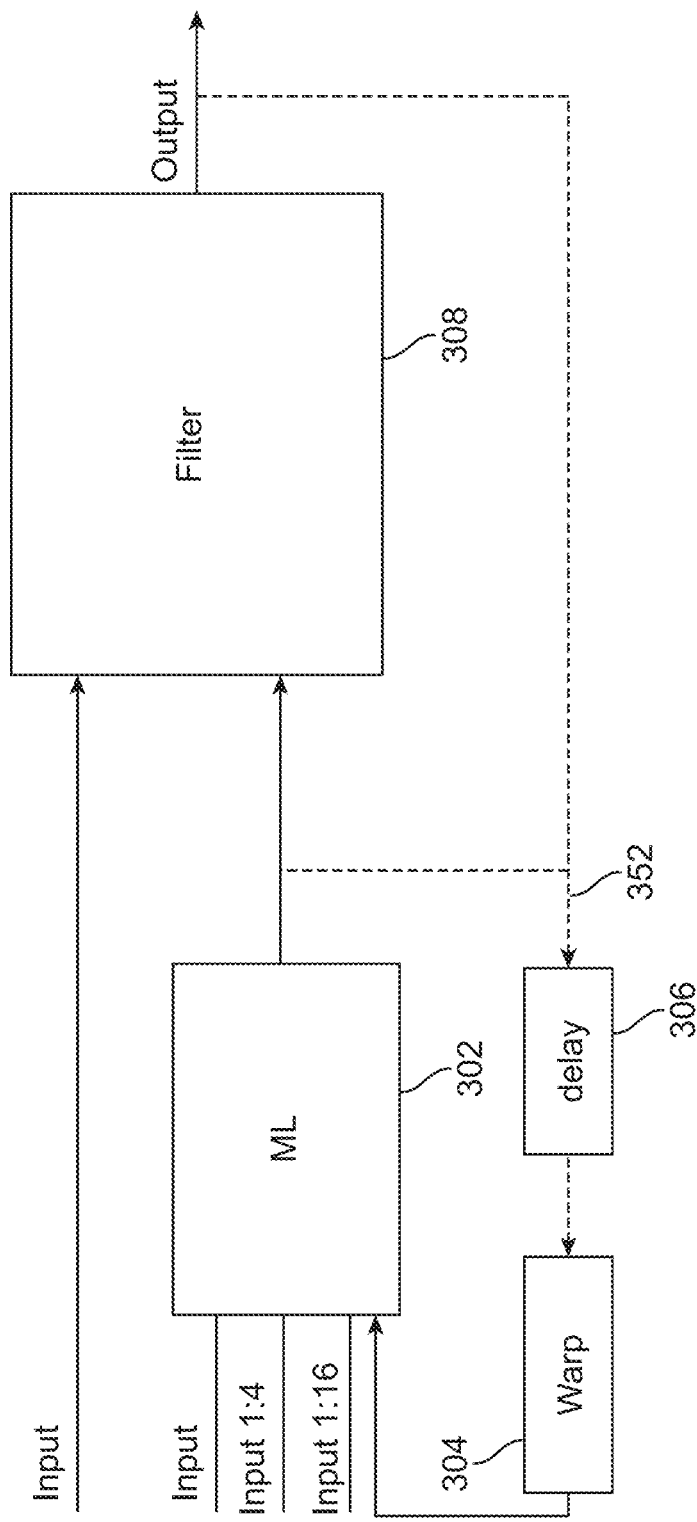

FIGS. 5A, 5B, and 5C illustrate an ML component 302 performing video processing using different resolution versions of an input frame, in accordance with certain aspects of the present disclosure. For example, the ML component 302 may receive an input frame and one or more down-sampled versions of the input frame. For instance, the ML component 302 may receive an input frame, input frame down-sampled with ratio 1:4 (e.g., having a fourth of the resolution of the input frame), input frame 1:16 (e.g., having a sixteenth of the resolution of the input frame), and so on. The ML component 302 may generate an output frame based on the different resolution versions of the input frame. For example, as shown in FIG. 5B, the ML component 302 may process an input frame 1:X (e.g., input frame down-sampled with ratio 1:X) based on processing results for the input frame down-sampled with ratio 1:4X. For instance, the input frame down-sampled with ratio 1:16 may be processed via the ML component 302 and a feedback loop to implement temporal and spatial processing. The processing results of the input frame down-sampled with ratio 1:16 may be used to process the input frame down-sampled with ratio 1:4. For example, as shown in FIG. 5B, the input frame down-sampled with ratio 1:4 (e.g., where X is equal to 4 in FIG. 5B) may be processed via the ML component 302 based on the processing results of the input frame down-sampled with ratio 1:16, generating the ML processing result (e.g., ML output) for the input frame down-sampled with ratio 1:4. The processing result for the input frame down-sampled with ratio 1:4 may be used to process the input frame (e.g., the non-down sampled input frame). As shown in FIG. 5C, the output of the ML component 302 generated using the input frames with different resolutions may be provided to an input of the filter component 308. The filter component 308 may further process the input frame based on the output of the ML component 302, as described herein.

Figure 6:
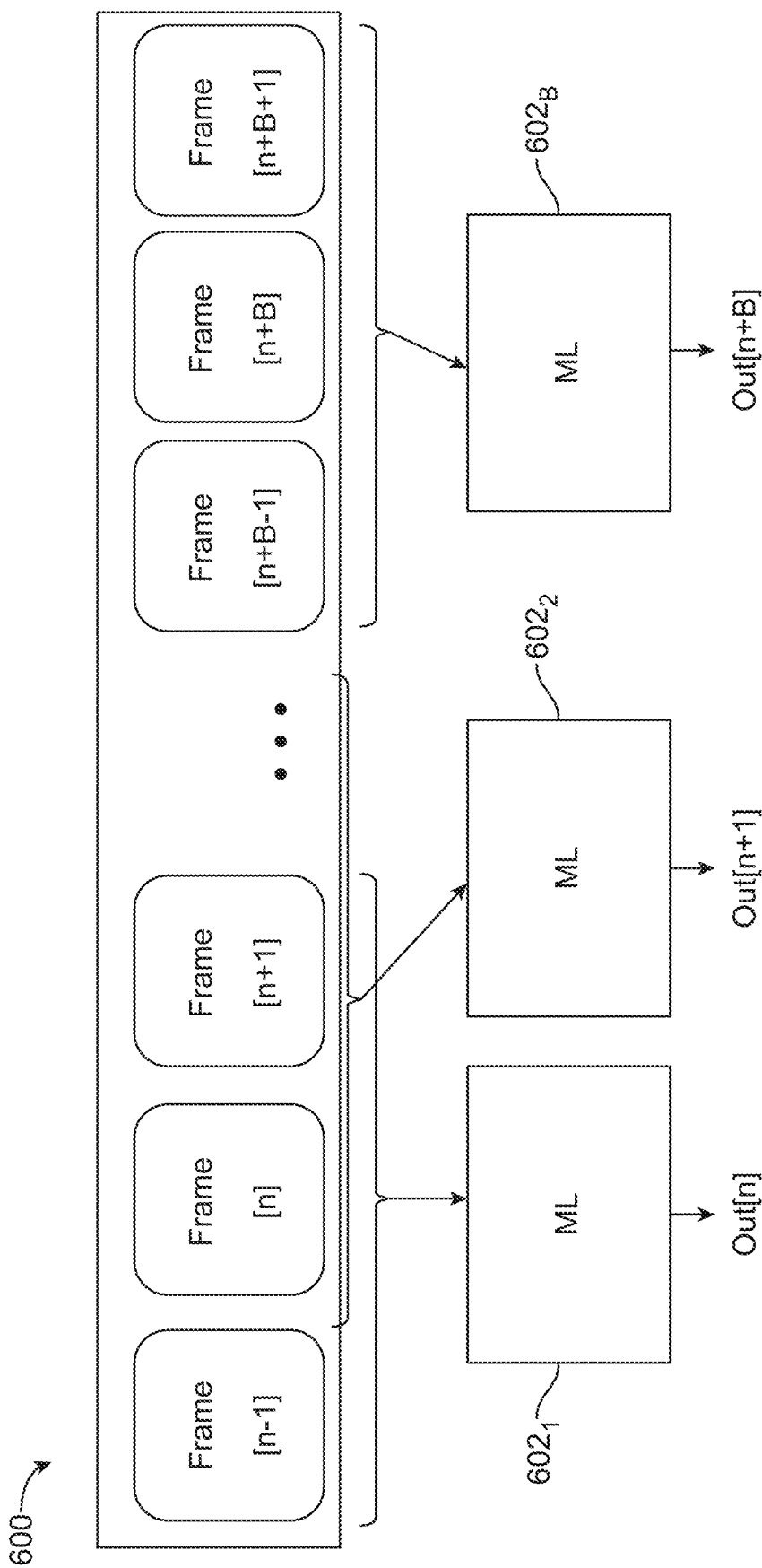
FIG. 6 is a diagram illustrating an example of a multi-frame ML video processing system, in accordance with certain aspects of the present disclosure.

FIG. 6 illustrates a multi-frame ML video processing system 600, in accordance with certain aspects of the present disclosure. As shown, ML operations $602_1$ to $602_B$ (collectively referred to as ML operations 602) may be performed, B being any integer greater than one. The ML operations 602 may be performed via the ML component 302, including a feedback loop to perform temporal and spatial video processing as described herein. Each ML operation is performed on multiple frames. For instance, ML operations $602_1$ may be performed on frame n−1, frame n, and frame n+1, n being any positive integer. ML operations $602_1$ may be performed to generate output n (e.g., labeled out[n]) based on frame n−1, frame n, and frame n+1. The ML operation $602_2$ may be performed to generate output n+1 (e.g., labeled out[n+1]) based on frame n, frame n+1, and frame n+2. The ML operation $602_B$ may be performed to generate output n+B (e.g., labeled out[n+B]) based on frame n+B−1, frame n+B, and frame n+B+1. The ML operations $602_1$ to $602_B$ may be performed in a sequential manner. While each ML operation is shown in FIG. 6 as being performed on three frames to facilitate understanding, each ML operation may be performed on any suitable number of frames (e.g., two or more frames). For instance, referring back to FIG. 3A, where the ML operation is performed on three frames, ML component 302 may process three input frames (input[0], input[1], and input[2]) as described herein.

While the ML operations 602 are described and shown as being performed on various frames, the ML operations may be performed on patches of a frame. For example, a frame may be divided into patches (e.g., regions), such as patch n−1, patch n, patch n+1 to patch n+B. The ML operations 602 may be performed in patch n−1, patch n, patch n+1 to patch n+B in a similar manner as described with respect to frames.

Figure 7:
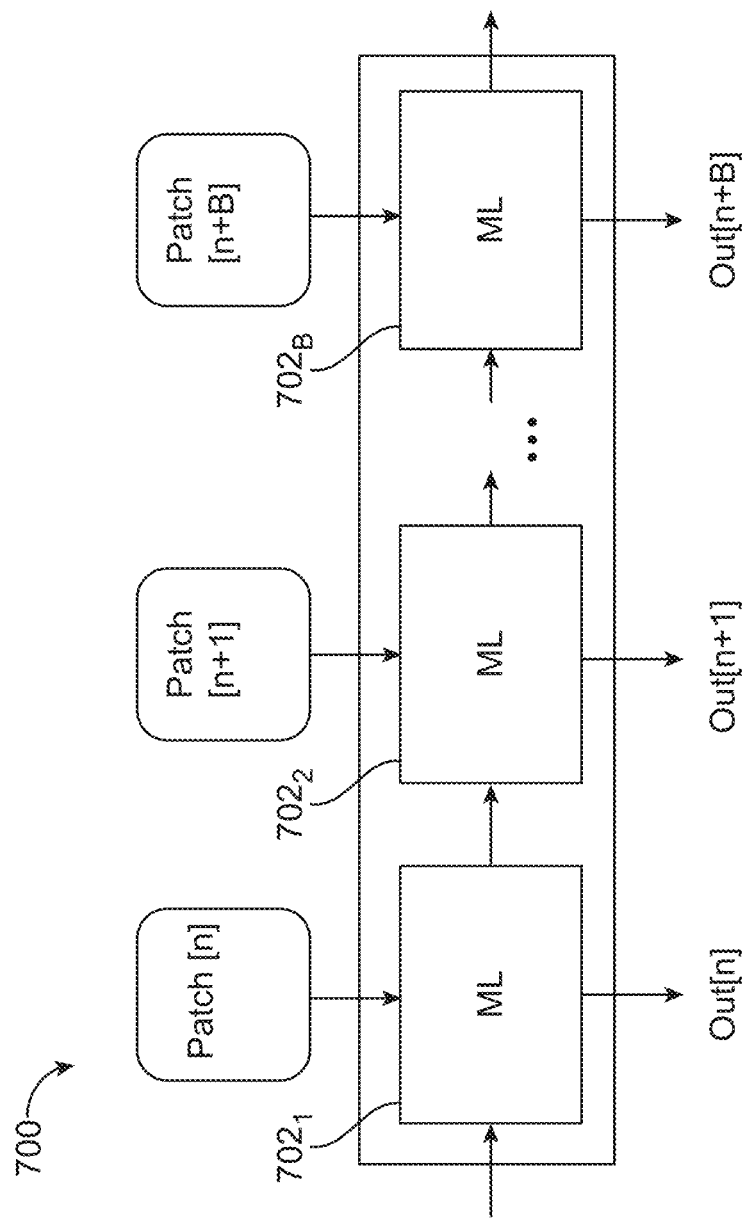
FIG. 7 is a diagram illustrating an example of a video processing system performing ML operations on patches of a frame, in accordance with certain aspects of the present disclosure.

FIG. 7 illustrates a video processing system 700 performing ML operations on patches of a frame, in accordance with certain aspects of the present disclosure. For example, a particular frame may be divided into multiple patches (e.g., a quantity of B patches, B being any integer greater than 1). ML operations $702_1$, $702_2$, to $702_B$ (collectively ML operations 702) may be performed on each of the patches sequentially with the output of ML operations on one patch being fed forward to facilitate the ML operations of a subsequent patch. For example, ML operations $702_1$ may be performed on patch n, generating an output n (out[n]). The results (e.g., out[n]) of the ML operations $702_1$ may be provided and used by ML operations $702_2$ to process patch n+1, and so on. By dividing a frame into patches and performing the ML operations 702 on the patches sequentially, the size of the ML component 302 may be reduced.

Figure 8:
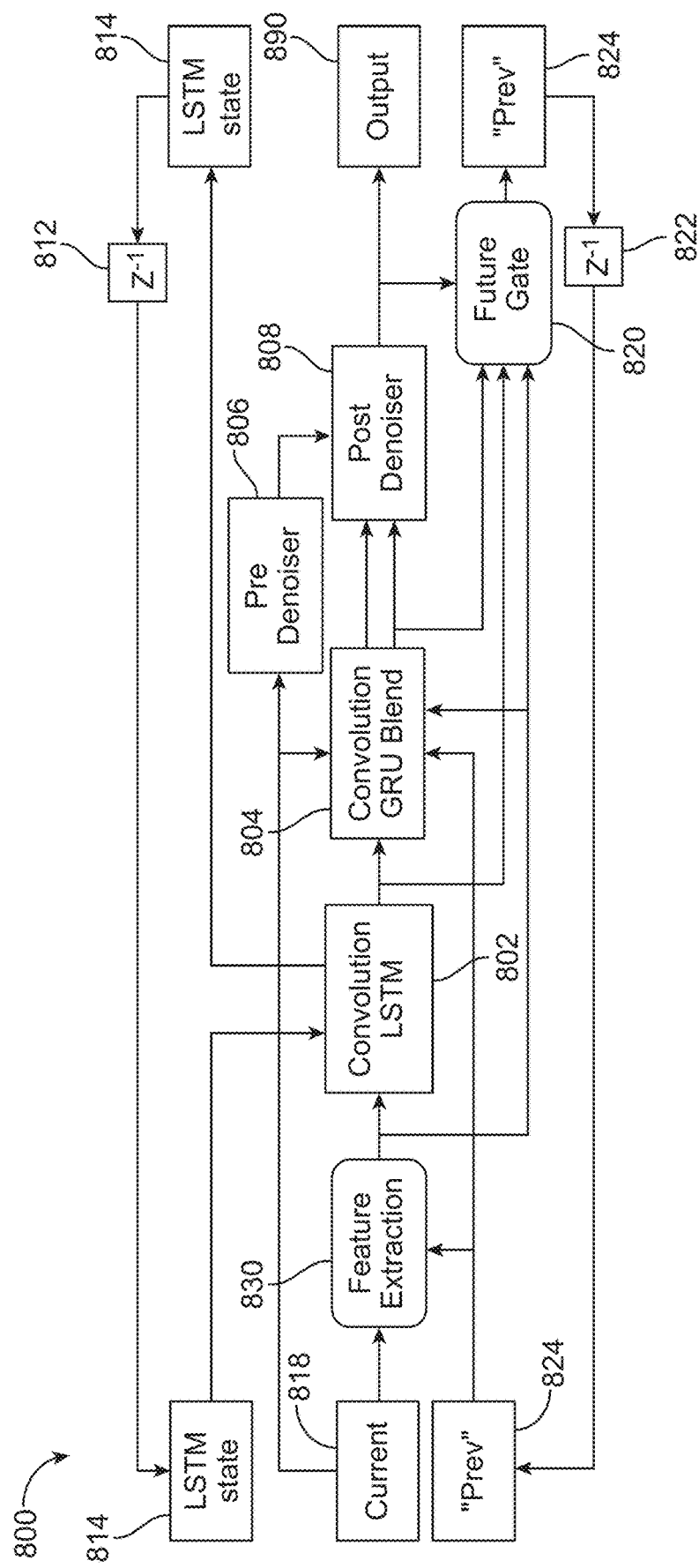
FIG. 8 is a diagram illustrating example techniques for video processing, in accordance with certain aspects of the present disclosure.

FIG. 8 illustrates example techniques for video processing 800, in accordance with certain aspects of the present disclosure. As shown, a current frame 818 may be provided to a feature extraction component 830, which provides an indication of features associated with the current frame 818 to a ML component 802 (e.g., convolution long-short term memory (LSTM) component). The output of the ML component 802 is provided to a convolution gated recurrent unit (GRU) blend component 804.

Generally, the convolution LSTM component determines the amount of temporal blending allowed for each pixel, which may depend on previous frames (e.g., depend on the state maintained by the convolution LSTM) since for a robust decision, the network may detect static area in several consecutive frames (e.g., otherwise it may be difficult to differentiate between noise and motion). The convolution GRU blend component 804 performs the actual blending between the current frame and the previous frame based on the output of the convolution LSTM component.

The output of the convolution GRU blend component 804 is provided to a post denoiser 808 to generate an output frame 890. As shown, the output of the post denoiser 808, the output of the convolution GRU blend component 804 and feature extraction component 830 are provided to a future gate 820. Future gate 820 may be used to extract information from previous stages to be used as input to next frame processing (e.g., after warping). For example, the future gate 820 may generate the feedback for the feedback loop 352. The future gate 820 generate a frame 824 (e.g., the feedback provided via feedback loop 352), which may be fed back through a delay element 822 to the feature extraction component 830 and the convolution GRU blend component 804 based on which respective outputs of the feature extraction component 830 and the convolution GRU blend component 804 may be generated. As shown, in some aspects, the current frame 818 may also be provided to a pre denoiser 806. The pre denoiser 806 may be used to perform initial filtering of new data (e.g., new frame) so that the data is more similar (or comparable) to information in frame 824 (e.g., since frame 824 is filtered over time and any current frame is noisier).

The output of the pre denoiser 806 may be provided to post denoiser 808, which may perform denoising operations on the output of the convolution GRU blend component 804 based on the output of the pre denoiser 806. As shown, the LSTM state 814 may be fed back through a delay element 812 to the convolution LSTM 802. In some aspects, the current frame 818 may correspond to the input 350, and frame 824 concatenated with LSTM state 814 may correspond to the feedback loop 352. In some aspects, although not shown, a warping component may be used to generate the frame 824 and LSTM state 814. As described, the convolution LSTM provides an output based on several frames. The LSTM state 814 is updated and internally used by the convolution LSTM for subsequent decisions.

Figure 9:
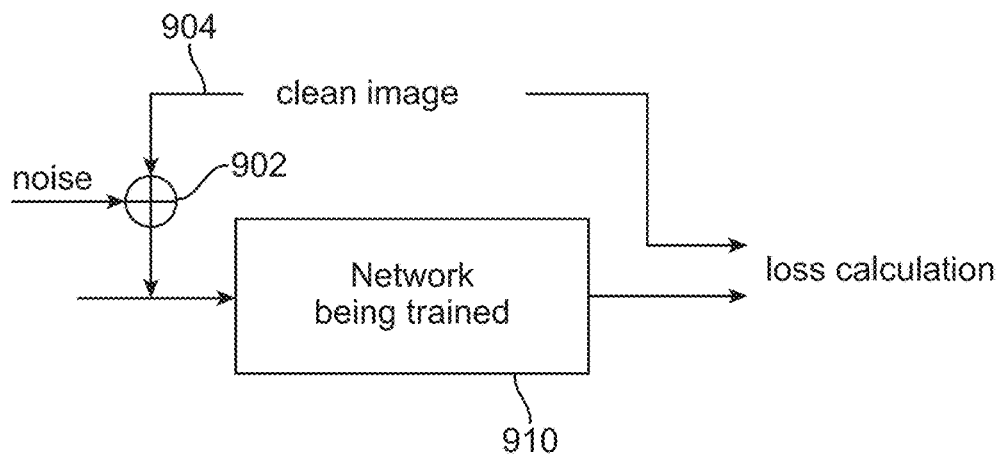
FIG. 9 is a diagram illustrating example techniques for training a network, in accordance with certain aspects of the present disclosure.

FIG. 9 illustrates example techniques for training a network 910 (e.g., for implementing the ML component 302), in accordance with certain aspects of the present disclosure. Clean images may be used as a basis for on-the-fly data generation. For example, a clean image 904 may be provided to a noise addition component 902, which may receive noise and generate a noisy version of the clean image 904. The noisy image may be provided to the network 910 being trained (e.g., for generating ML component 302). The output of network 910 and the clean image 904 may be used to perform a loss calculation and train the network accordingly. Almost noise-free videos may be captured using complex motion and occlusions, different light conditions, and different exposures to generate clean images. The videos may be then augmented using artificially added motion (e.g., local motion corresponding to movement of one or more objects in the scene for which frames are being captured or global motion corresponding to movement of the entire scene), artificial brightness changes, and artificially added noise to train the network as described. The added noise may be a mixture of Poisson and Gaussian noise. In some aspects, the noise may be applied in the sensor domain. For example, a YUV image may be reverted to a linear RAW domain image. The noise may be added to the RAW domain image and converted back to the YUV domain and used as the noisy image to train the network.

Figure 10:
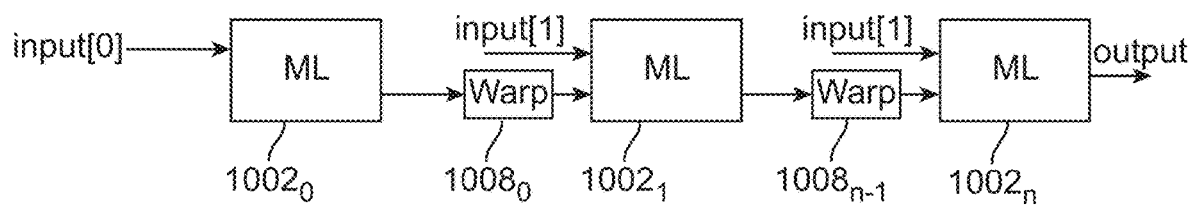
FIG. 10 is a diagram illustrating example techniques using unrolled-in-time of frames of a video with non-valid cropping, in accordance with certain aspects of the present disclosure.

FIG. 10 illustrates example techniques using frames of a video unrolled-in-time with non-valid cropping, in accordance with certain aspects of the present disclosure. As described, a video may include multiple frames, labeled input[0], input[1], to input[n], n being any integer greater than 1. As shown, input[0] may be provided to an ML component $1002_0$. The ML component $1002_0$ may process input[0] and generate an output which may be warped (e.g., for alignment with input[1]) via warp component $1008_0$ and provided to the ML component $1002_1$. The ML component $1002_1$ processes input[1] based on the warped output of ML component $1002_0$. Similarly, the output of ML component $1002_1$ may be warped via warp component $1008_{n-1}$ and provided to the ML component $1002_{n-1}$, based on which input[n] may be warped. Thus, several implementations of the same ML model with different inputs are provided and trained together.

In some aspects, non-valid cropping may be implemented. For example, when machine learning operations are applied on an input, a convolution is performed, providing an output that is smaller than the input to the ML component due to the cropping of non-valid pixels of the input frame. Thus, the size of the output of ML components $1002_1$ may be smaller than the size of the output of ML components $1002_0$, the size of the output of ML components $1002_2$ may be smaller than the size of the output of ML components $1002_1$, and so on. Due to such cropping, the size of input[0] may have to be large to have an output at the end of the sequence of ML components (e.g., at the output of ML component $1002_0$. Thus, in some aspects, non-valid cropping may be implemented to reduce the amount by which the size of the output of each ML component is reduced. For example, fewer than all non-valid pixels may be cropped out for each input frame. Thus, cropping may be performed by including some non-valid pixels in an attempt to reduce the required size of input[0].

Figure 11:
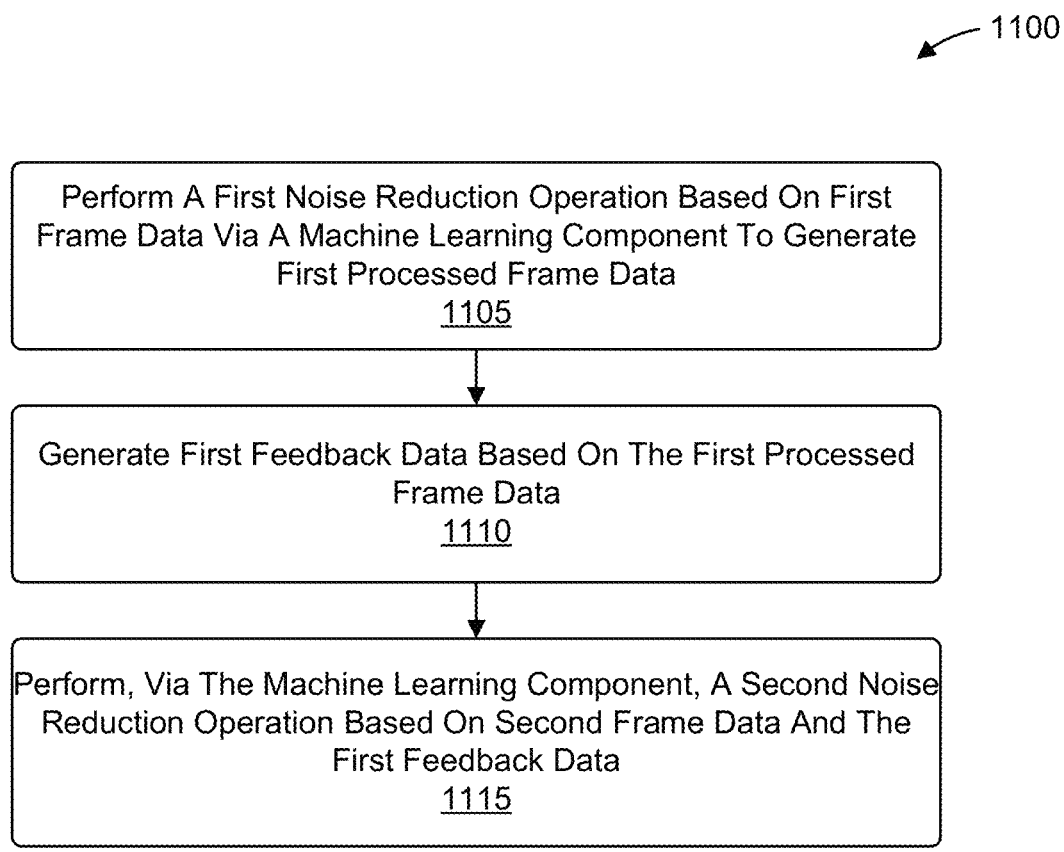
FIG. 11 is a flow diagram illustrating operations of a process for processing image data.

FIG. 11 is a flow diagram illustrating operations of a process 1100 for processing image data. The operations of the process 1100 may be performed by an imaging system. In some examples, the imaging system that performs the operations can be the imaging system 200. In some examples, the imaging system that performs the operations of the process 1100 can include, for example, one or more means for performing the operations, which can include the image capture and processing system 100, the image capture device 105A, the image processing device 105B, the image processor 150, the ISP 154, the host processor 152, the imaging system 200, the ISP 220, or a combination thereof.

At operation 1105, the imaging system performs a first noise reduction operation based on first frame data (e.g., input[0] shown in FIG. 3A) via a machine learning component (e.g., ML component 302) to generate first processed frame data (e.g., any output such as out[0] shown in FIG. 3A). In some aspects, the imaging system may provide, to the machine learning component, an indication (e.g., indication 370 shown in FIG. 3B) of a tradeoff between noise reduction and one or more other frame characteristics (e.g., level detail). The first noise reduction operation may be performed in accordance with the indication of the tradeoff.

At operation 1110, the imaging system generates first feedback data (e.g., via feedback loop 352) based on the first processed frame data. In some aspects, to generate the first feedback data, the imaging system warps (e.g., via warp component 304) one or more pixels of the first processed frame data. The one or more pixels may be warped to align one or more features of the first processed frame data with one or more features of the second frame data.

At operation 1115, the imaging system performs, via the machine learning component, a second noise reduction operation based on second frame data (e.g., input[1]) and the first feedback data.

In some aspects, the imaging system filters the second frame data via an image filter (e.g., filter component 308 as shown in FIG. 3C) to generate filtered frame data. The second noise reduction operation (e.g., via ML component 302) may be performed further based on the filtered frame data. The imaging system may filter the second frame data via the image filter based on the first feedback data. For example, as shown in FIG. 3C, the feedback loop may be implemented between the output of the ML component 302 and the input of the filter component 308.

In some aspects, the imaging system may generate, via an image filter (e.g., filter component 308 as shown in FIG. 3D), filtered frame data based on the first frame data (e.g., input[1]). The second noise reduction operation being performed based on the first processed frame data comprises the second noise reduction operation being performed based on the filtered frame data.

In some aspects, the imaging system performs, via a frame processing component (e.g., processing component 414), a third noise reduction operation based on the first processed frame data and third frame data to generate second processed frame data. The first frame data (e.g., input frame such as input[0] as down-sampled with ratio 1:X shown in FIG. 4) may include a down-sampled version of the third frame data (e.g., non-down-sampled of the input frame such as input[0]). The third noise reduction operation may be performed using machine learning. The imaging system may generate second feedback data (e.g., via warp component 412 of FIG. 4) based on the second processed frame data (e.g., generated by processing component 414). The imaging system may perform a fourth noise reduction operation (e.g., via processing component 414) based on fourth frame data (e.g., input[1]) and the second feedback data. The second frame data (e.g., input frame such as input[1] as down-sampled with ratio 1:X) may be a down-sampled version of the fourth frame data. In some aspects, the imaging system may generate, via an image filter (e.g., filter component 308 shown in FIG. 5C), a filtered output frame based on the second processed frame data and the third frame data.

In some aspects, the imaging system may perform the second noise reduction operation (e.g., ML operation $602_1$ shown in FIG. 6) to generate a first output frame (e.g., out[n] shown in FIG. 6) of a video. The imaging system may perform a third noise reduction operation (e.g., ML operation $602_2$ shown in FIG. 6) based on the second frame data to generate second processed frame data, generate second feedback data based on the second processed frame data, and perform a fourth noise reduction operation based on third frame data and the second feedback data to generate a second output frame (e.g., out[n+1] shown in FIG. 6) of the video.

In some aspects, the first frame data is associated with a first patch (e.g., patch[n] shown in FIG. 7) of a frame. The imaging system may perform a third noise reduction operation (e.g., ML operation $702_2$ shown in FIG. 7) based on a second patch of the frame and the first processed frame data generated using the first patch of the frame.

In some examples, the processes described herein (e.g., the process 1100 and/or other processes described herein) may be performed by a computing device or apparatus. In some examples, the process 1100 can be performed by the imaging system 200. In some examples, the process 1100 can be performed by a computing device with the computing system 1300 shown in FIG. 13. For instance, a computing device with the computing system 1300 shown in FIG. 13 can include at least some of the components of the imaging system 200, and/or can implement the operations of the process 1100 of FIG. 11.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1100 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
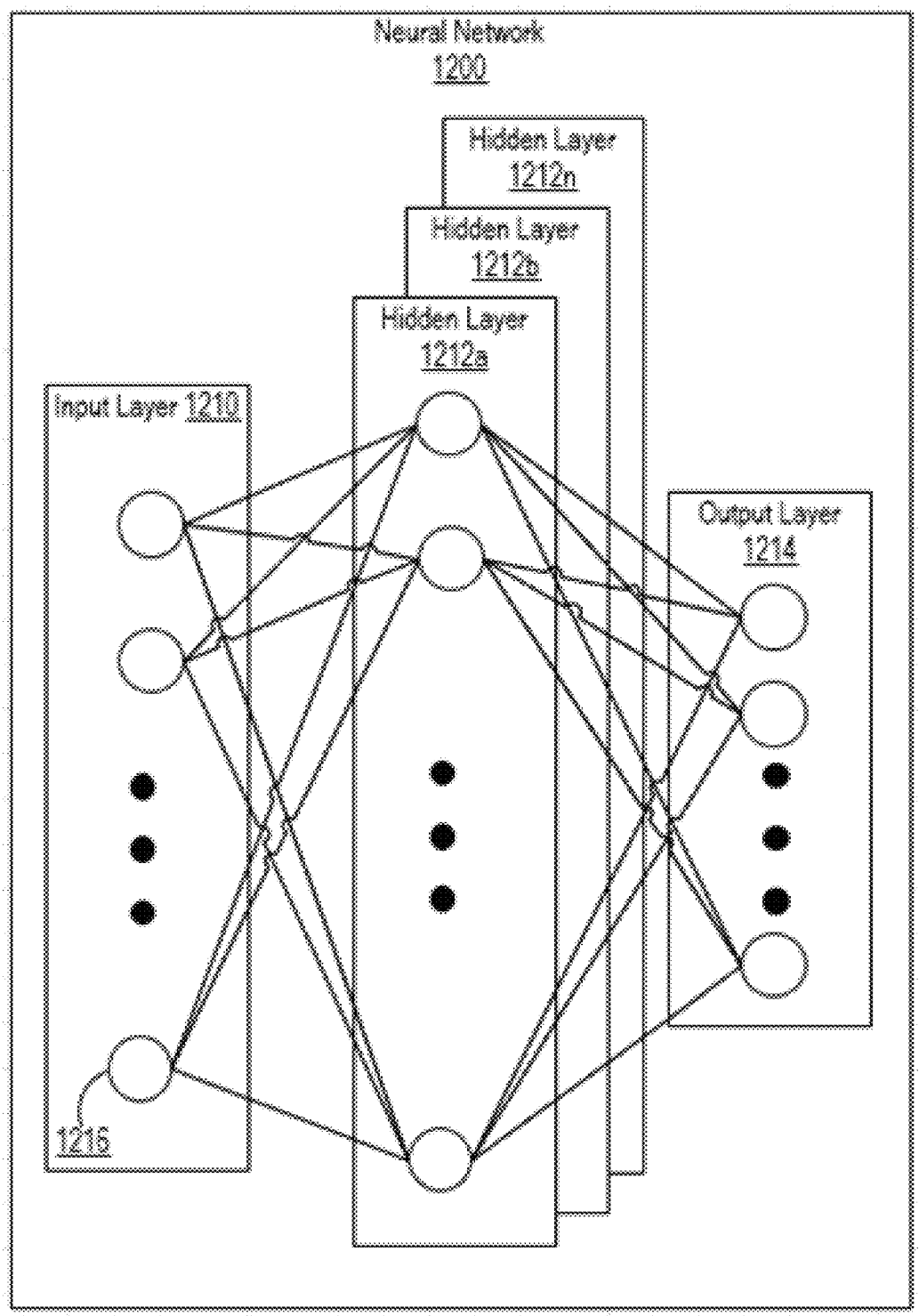
FIG. 12 is a diagram illustrating an example neural network.

FIG. 12 is a block diagram illustrating an example of a neural network that can be used by the trained machine learning system that generates the settings used by the image signal processor (ISP), in accordance with some examples. The neural network 1200 can include any type of deep network, such as a convolutional neural network (CNN), an autoencoder, a deep belief net (DBN), a Recurrent Neural Network (RNN), a Generative Adversarial Networks (GAN), and/or other type of neural network.

An input layer 1210 of the neural network 1200 includes input data. The input data of the input layer 1210 can include data representing the pixels of an input image frame. In an illustrative example, the input data of the input layer 1210 can include data representing the pixels of image data and/or metadata corresponding to the image data. The images can include image data from an image sensor including raw pixel data (including a single color per pixel based, for example, on a Bayer filter) or processed pixel values (e.g., RGB pixels of an RGB image). The neural network 1200 includes multiple hidden layers 1212a, 1212b, through 1212n. The hidden layers 1212a, 1212b, through 1212n include "n" number of hidden layers, where "n" is an integer greater than or equal to one. The number of hidden layers can be made to include as many layers as needed for the given application. The neural network 1200 further includes an output layer 1214 that provides an output resulting from the processing performed by the hidden layers 1212a, 1212b, through 1212n. In some examples, the output layer 1214 can provide one or more settings.

The neural network 1200 is a multi-layer neural network of interconnected filters. Each filter can be trained to learn a feature representative of the input data. In some cases, the neural network 1200 can include a feed-forward network, in which case there are no feedback connections where outputs of the network are fed back into itself. In some cases, the network 1200 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1210 can activate a set of nodes in the first hidden layer 1212a. For example, as shown, each of the input nodes of the input layer 1210 can be connected to each of the nodes of the first hidden layer 1212a. The nodes of a hidden layer can transform the information of each input node by applying activation functions (e.g., filters) to this information. The information derived from the transformation can then be passed to and can activate the nodes of the next hidden layer 1212b, which can perform their own designated functions. Example functions include convolutional functions, downscaling, upscaling, data transformation, and/or any other suitable functions. The output of the hidden layer 1212b can then activate nodes of the next hidden layer, and so on. The output of the last hidden layer 1212n can activate one or more nodes of the output layer 1214, which provides a processed output image. In some cases, while nodes (e.g., node 1216) in the neural network 1200 are shown as having multiple output lines, a node has a single output and all lines shown as being output from a node represent the same output value.

In some cases, each node or interconnection between nodes can have a weight that is a set of parameters derived from the training of the neural network 1200. For example, an interconnection between nodes can represent a piece of information learned about the interconnected nodes. The interconnection can have a tunable numeric weight that can be set (e.g., based on a training dataset), allowing the neural network 1200 to be adaptive to inputs and able to learn as more and more data is processed.

The neural network 1200 is pre-trained to process the features from the data in the input layer 1210 using the different hidden layers 1212a, 1212b, through 1212n in order to provide the output through the output layer 1214.

Figure 13:
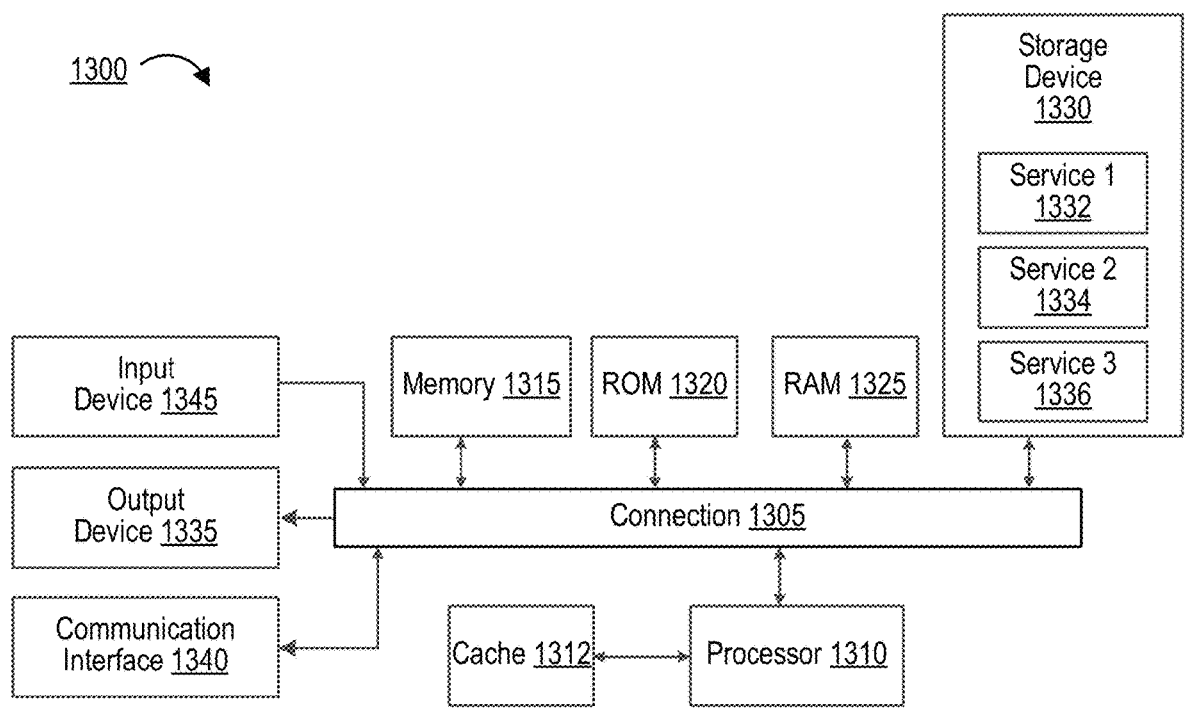
FIG. 13 is a diagram illustrating an example of a computing system.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing frame data, the apparatus comprising: a memory; and one or more processors coupled to the memory, the one or more processors configured to: perform a first noise reduction operation based on first frame data via a machine learning component to generate first processed frame data; generate first feedback data based on the first processed frame data; and perform, via the machine learning component, a second noise reduction operation based on second frame data and the first feedback data.

Aspect 2. The apparatus of aspect 1, wherein, to generate the first feedback data, the one or more processors are configured to warp one or more pixels of the first processed frame data.

Aspect 3. The apparatus of aspect 2, wherein the one or more processors are configured to warp the one or more pixels to align one or more features of the first processed frame data with one or more features of the second frame data.

Aspect 4. The apparatus of any one of aspects 1-3, wherein the one or more processors are further configured to provide, to the machine learning component, an indication of a tradeoff between noise reduction and one or more other frame characteristics, wherein the first noise reduction operation is performed in accordance with the indication of the tradeoff.

Aspect 5. The apparatus of any one of aspects 1-4, wherein the one or more processors are further configured to filter the second frame data via an image filter to generate filtered frame data, and wherein the second noise reduction operation is performed further based on the filtered frame data.

Aspect 6. The apparatus of aspect 5, wherein the one or more processors are configured to filter the second frame data via the image filter based on the first feedback data.

Aspect 7. The apparatus of any one of aspects 1-6, wherein the one or more processors are further configured to generate, via an image filter, filtered frame data based on the first frame data, wherein the second noise reduction operation being performed based on the first processed frame data comprises the second noise reduction operation being performed based on the filtered frame data.

Aspect 8. The apparatus of any one of aspects 1-7, wherein the one or more processors are further configured to perform, via a frame processing component, a third noise reduction operation based on the first processed frame data and third frame data to generate second processed frame data, wherein the first frame data comprises a down-sampled version of the third frame data.

Aspect 9. The apparatus of aspect 8, wherein the third noise reduction operation is performed using machine learning.

Aspect 10. The apparatus of any one of aspects 8-9, wherein the one or more processors are further configured to: generate second feedback data based on the second processed frame data; and perform a fourth noise reduction operation based on fourth frame data and the second feedback data, wherein the second frame data comprises a down-sampled version of the fourth frame data.

Aspect 11. The apparatus of any one of aspects 8-10, wherein the one or more processors are further configured to generate, via an image filter, a filtered output frame based on the second processed frame data and the third frame data.

Aspect 12. The apparatus of any one of aspects 1-11, wherein the one or more processors are configured to perform the second noise reduction operation to generate a first output frame of a video, and wherein the one or more processors are further configured to: perform a third noise reduction operation based on the second frame data to generate second processed frame data; generate second feedback data based on the second processed frame data; and perform a fourth noise reduction operation based on third frame data and the second feedback data to generate a second output frame of the video.

Aspect 13. The apparatus of any one of aspects 1-12, wherein: the first frame data is associated with a first patch of a frame; and the one or more processors are further configured to perform a third noise reduction operation based on a second patch of the frame and the first processed frame data generated using the first patch of the frame.

Aspect 14. A method for processing frame data, the method comprising: performing a first noise reduction operation based on first frame data via a machine learning component to generate first processed frame data; generating first feedback data based on the first processed frame data; and performing, via the machine learning component, a second noise reduction operation based on second frame data and the first feedback data.

Aspect 15. The method of aspect 14, wherein generating the first feedback data comprises warping one or more pixels of the first processed frame data.

Aspect 16. The method of aspect 15, wherein the one or more pixels are warped to align one or more features of the first processed frame data with one or more features of the second frame data.

Aspect 17. The method of any one of aspects 14-16, further comprising providing, to the machine learning component, an indication of a tradeoff between noise reduction and one or more other frame characteristics, wherein the first noise reduction operation is performed in accordance with the indication of the tradeoff.

Aspect 18. The method of any one of aspects 14-17, further comprising filtering the second frame data via an image filter to generate filtered frame data, and wherein the second noise reduction operation is performed further based on the filtered frame data.

Aspect 19. The method of aspect 18, wherein the second frame data is filtered via the image filter based on the first feedback data.

Aspect 20. The method of any one of aspects 14-19, further comprising generating, via an image filter, filtered frame data based on the first frame data, wherein the second noise reduction operation being performed based on the first processed frame data comprises the second noise reduction operation being performed based on the filtered frame data.

Aspect 21. The method of any one of aspects 14-20, further comprising performing, via a frame processing component, a third noise reduction operation based on the first processed frame data and third frame data to generate second processed frame data, wherein the first frame data comprises a down-sampled version of the third frame data.

Aspect 22. The method of aspect 21, wherein the third noise reduction operation is performed using machine learning.

Aspect 23. The method of any one of aspects 21-22, wherein the method further comprises: generating second feedback data based on the second processed frame data; and performing a fourth noise reduction operation based on fourth frame data and the second feedback data, wherein the second frame data comprises a down-sampled version of the fourth frame data.

Aspect 24. The method of any one of aspects 21-23, wherein method further comprises generating, via an image filter, a filtered output frame based on the second processed frame data and the third frame data.

Aspect 25. The method of any one of aspects 14-24, wherein the second noise reduction operation is performed to generate a first output frame of a video, and wherein the method further comprises: perform a third noise reduction operation based on the second frame data to generate second processed frame data; generate second feedback data based on the second processed frame data; and perform a fourth noise reduction operation based on third frame data and the second feedback data to generate a second output frame of the video.

Aspect 26. The method of any one of aspects 14-25, wherein: the first frame data is associated with a first patch of a frame; and the method further comprises performing a third noise reduction operation based on a second patch of the frame and the first processed frame data generated using the first patch of the frame.

Aspect 27. A computer-readable medium comprising at least one instruction for causing a computer or processor to perform operations according to any of aspects 1 to 26.

Aspect 28. An apparatus for processing frame data, the apparatus including means for performing operations according to any of aspects 1 to 26.

Aspect 29. An apparatus for processing frame data. The apparatus includes at least one memory and at least one processor coupled to the at least one memory. The at least one processor is configured to perform operations according to any of aspects 1 to 26.

What is claimed is:

1. An apparatus for processing frame data, the apparatus comprising:
a memory; and
one or more processors coupled to the memory, the one or more processors configured to:
perform a first noise reduction operation based on first frame data via a machine learning component to generate first processed frame data;
generate first feedback data based on the first processed frame data;
perform, via the machine learning component, a second noise reduction operation based on second frame data and the first feedback data; and
perform, via a frame processing component, a third noise reduction operation based on the first processed frame data and third frame data to generate second processed frame data.

2. The apparatus of claim 1, wherein, to generate the first feedback data, the one or more processors are configured to warp one or more pixels of the first processed frame data.

3. The apparatus of claim 2, wherein the one or more processors are configured to warp the one or more pixels to align one or more features of the first processed frame data with one or more features of the second frame data.

4. The apparatus of claim 1, wherein the one or more processors are further configured to filter the second frame data via an image filter to generate filtered frame data, and wherein the second noise reduction operation is performed further based on the filtered frame data.

5. The apparatus of claim 4, wherein the one or more processors are configured to filter the second frame data via the image filter based on the first feedback data.

6. The apparatus of claim 1, wherein the one or more processors are further configured to generate, via an image filter, filtered frame data based on the first frame data, wherein the second noise reduction operation being performed based on the first processed frame data comprises the second noise reduction operation being performed based on the filtered frame data.

7. The apparatus of claim 1, wherein the first frame data comprises a down-sampled version of the third frame data.

8. The apparatus of claim 1, wherein the third noise reduction operation is performed using machine learning.

9. The apparatus of claim 1, wherein the one or more processors are further configured to:
generate second feedback data based on the second processed frame data; and
perform a fourth noise reduction operation based on fourth frame data and the second feedback data, wherein the second frame data comprises a down-sampled version of the fourth frame data.

10. The apparatus of claim 1, wherein the one or more processors are further configured to generate, via an image filter, a filtered output frame based on the second processed frame data and the third frame data.

11. The apparatus of claim 1, wherein the one or more processors are configured to perform the second noise reduction operation to generate a first output frame of a video, and wherein the one or more processors are further configured to:
perform the third noise reduction operation based on the second frame data to generate second processed frame data;
generate second feedback data based on the second processed frame data; and
perform a fourth noise reduction operation based on third frame data and the second feedback data to generate a second output frame of the video.

12. The apparatus of claim 1, wherein:
the first frame data is associated with a first patch of a frame; and the one or more processors are further configured to perform a third noise reduction operation based on a second patch of the frame and the first processed frame data generated using the first patch of the frame.

13. A method for processing frame data, the method comprising:
performing a first noise reduction operation based on first frame data via a machine learning component to generate first processed frame data;
generating first feedback data based on the first processed frame data;
performing, via the machine learning component, a second noise reduction operation based on second frame data and the first feedback data; and
performing, via a frame processing component, a third noise reduction operation based on the first processed frame data and third frame data to generate second processed frame data.

14. The method of claim 13, wherein generating the first feedback data comprises warping one or more pixels of the first processed frame data.

15. The method of claim 14, wherein the one or more pixels are warped to align one or more features of the first processed frame data with one or more features of the second frame data.

16. The method of claim 13, further comprising filtering the second frame data via an image filter to generate filtered frame data, and wherein the second noise reduction operation is performed further based on the filtered frame data.

17. The method of claim 16, wherein the second frame data is filtered via the image filter based on the first feedback data.

18. The method of claim 13, further comprising generating, via an image filter, filtered frame data based on the first frame data, wherein the second noise reduction operation being performed based on the first processed frame data comprises the second noise reduction operation being performed based on the filtered frame data.

19. The method of claim 13, wherein the first frame data comprises a down-sampled version of the third frame data.

20. The method of claim 13, wherein the third noise reduction operation is performed using machine learning.

21. The method of claim 13, wherein the method further comprises:
generating second feedback data based on the second processed frame data; and
performing a fourth noise reduction operation based on fourth frame data and the second feedback data, wherein the second frame data comprises a down-sampled version of the fourth frame data.

22. The method of claim 13, wherein method further comprises generating, via an image filter, a filtered output frame based on the second processed frame data and the third frame data.

23. The method of claim 13, wherein the second noise reduction operation is performed to generate a first output frame of a video, and wherein the method further comprises:
perform the third noise reduction operation based on the second frame data to generate second processed frame data;
generate second feedback data based on the second processed frame data; and
perform a fourth noise reduction operation based on third frame data and the second feedback data to generate a second output frame of the video.

24. The method of claim 13, wherein:
the first frame data is associated with a first patch of a frame; and
the method further comprises performing a third noise reduction operation based on a second patch of the frame and the first processed frame data generated using the first patch of the frame.

25. A non-transitory computer-readable medium having instructions stored thereon, that when executed by a processor, causes the processor to:
perform a first noise reduction operation based on first frame data via a machine learning component to generate first processed frame data;
generate first feedback data based on the first processed frame data;
perform, via the machine learning component, a second noise reduction operation based on second frame data and the first feedback data; and
perform, via a frame processing component, a third noise reduction operation based on the first processed frame data and third frame data to generate second processed frame data.

* * * * *